(12) United States Patent
Trethewey et al.

(10) Patent No.: US 9,934,386 B2
(45) Date of Patent: Apr. 3, 2018

(54) METHOD AND APPARATUS FOR MANAGING THE PRIVACY AND DISCLOSURE OF LOCATION INFORMATION

(71) Applicant: Intel Corporation, Santa Clara, CA (US)

(72) Inventors: James R. Trethewey, Hillsboro, OR (US); Dhananjay V. Keskar, Beaverton, OR (US); Matthew E. Hoekstra, Forest Grove, OR (US); Uma M. Gadamsetty, Chandler, AZ (US); Manoj B. Agnihotri, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 882 days.

(21) Appl. No.: 13/893,860

(22) Filed: May 14, 2013

(65) Prior Publication Data

US 2013/0326629 A1  Dec. 5, 2013

Related U.S. Application Data

(63) Continuation of application No. 10/663,478, filed on Sep. 15, 2003, now Pat. No. 8,473,729.

(51) Int. Cl.
*H04L 29/06* (2006.01)
*G06F 21/60* (2013.01)
(Continued)

(52) U.S. Cl.
CPC .......... *G06F 21/60* (2013.01); *G06F 21/6245* (2013.01); *H04W 12/02* (2013.01)

(58) Field of Classification Search
CPC .. G06F 21/00; G06F 12/0817; G06F 12/6272; G06F 12/6254; G06K 9/0006; G07C 9/00158
See application file for complete search history.

(56) References Cited

U.S. PATENT DOCUMENTS 5,588,009 A  12/1996  Will
6,327,535 B1 *  12/2001  Evans et al. .................. 701/300
(Continued)

FOREIGN PATENT DOCUMENTS

EP  1217857 A2  6/2002
WO  2006/106303 A1  10/2006

OTHER PUBLICATIONS

Non Final Office Action dated Jun. 26, 2007 for U.S. Appl. No. 10/663,478; 28 pages.
(Continued)

*Primary Examiner* — Joseph P Hirl
*Assistant Examiner* — Leynna Truvan
(74) *Attorney, Agent, or Firm* — Barnes & Thornburg LLP

(57) ABSTRACT

An approach for managing the privacy and disclosure of location information associated with a computer system. For one aspect, a request is received from a requestor for a location property associated with a location of a computer system. It is then determined whether a privacy preference associated with the requestor has been specified. If not, a user may be prompted to supply privacy preferences associated with the requestor. The privacy preferences are then applied to determine whether or not to provide the requested information. A user setting, such as a basic input-output system memory location setting, may also be implemented to enable and/or disable location-aware computing.

13 Claims, 6 Drawing Sheets

(51) Int. Cl.
*G06F 21/62* (2013.01)
*H04W 12/02* (2009.01)

(56) References Cited

U.S. PATENT DOCUMENTS

| | | |
|---|---|---|
| 6,499,110 B1 | 12/2002 | Moses et al. |
| 6,505,048 B1 | 1/2003 | Moles et al. |
| 6,571,279 B1 | 5/2003 | Herz et al. |
| 6,594,483 B2 | 7/2003 | Nykanen et al. |
| 6,675,017 B1 * | 1/2004 | Zellner et al. ............. 455/456.1 |
| 6,678,827 B1 | 1/2004 | Rothermel et al. |
| 6,886,101 B2 | 4/2005 | Glazer et al. |
| 6,938,155 B2 | 8/2005 | D'Sa et al. |
| 7,054,648 B2 | 5/2006 | Abtin et al. |
| 7,093,286 B1 | 8/2006 | King |
| 7,100,204 B1 | 8/2006 | Myllymaki et al. |
| 7,145,437 B2 | 12/2006 | Jalkanen et al. |
| 7,194,760 B2 | 3/2007 | Nordman et al. |
| 7,203,752 B2 | 4/2007 | Rice et al. |
| 7,206,744 B2 | 4/2007 | Suryanaraya |
| 7,206,791 B2 | 4/2007 | Hind et al. |
| 8,046,164 B1 | 10/2011 | Burch |
| 8,473,729 B2 | 6/2013 | Trethewey |
| 2002/0035605 A1 | 3/2002 | McDowell et al. |
| 2002/0174073 A1 | 11/2002 | Nordman et al. |
| 2004/0102197 A1 | 5/2004 | Dietz |
| 2004/0203900 A1 | 10/2004 | Cedervall et al. |
| 2005/0003804 A1 | 1/2005 | Huomo et al. |
| 2011/0078758 A1 | 3/2011 | Kohlenberg et al. |

OTHER PUBLICATIONS

Final Office Action dated Jan. 25, 2008 for U.S. Appl. No. 10/663,478; 25 pages.
Non Final Office Action dated Sep. 25, 2008 for U.S. Appl. No. 10/663,478; 28 pages.
Final Office Action dated Apr. 28, 2009 for U.S. Appl. No. 10/663,478; 29 pages.
Non Final Office Action dated Oct. 28, 2009 for U.S. Appl. No. 10/663,478; 30 pages.
Non Final Office Action dated Jun. 22, 2010 for U.S. Appl. No. 10/663,478; 31 pages.
Final Office Action dated Feb. 3, 2011 for U.S. Appl. No. 10/663,478; 31 pages.
Non Final Office Action dated May 15, 2012 for U.S. Appl. No. 10/663,478; 23 pages.
Notice of Allowance dated Feb. 8, 2013 for U.S. Appl. No. 10/663,478; 7 pages.

* cited by examiner

METHOD AND APPARATUS FOR MANAGING THE PRIVACY AND DISCLOSURE OF LOCATION INFORMATION

CROSS-REFERENCE TO RELATED U.S. PATENT APPLICATION

This application is a continuation application of U.S. application Ser. No. 10/663,478, entitled "METHOD AND APPARATUS FOR MANAGING THE PRIVACY AND DISCLOSURE OF LOCATION INFORMATION," which was filed on Sep. 15, 2003.

BACKGROUND

An embodiment of the present invention relates to the field of computing systems and, more particularly, to an approach for managing the privacy and disclosure of location information related to computing systems.

Some current and planned computer systems have or will have the capability to automatically determine location properties such as, for example, latitude, longitude, altitude, street address, city, state, postal code, and/or country.

For some applications, it is useful to provide access to this information to enable, for example, location-based services. Under other circumstances, it may be desirable to protect the privacy of such information.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A method and apparatus for managing the privacy and disclosure of location information is described. In the following description, particular software modules, systems, etc. are described for purposes of illustration. It will be appreciated, however, that other embodiments are applicable to other types of software modules and/or systems, for example.

Figure 1:
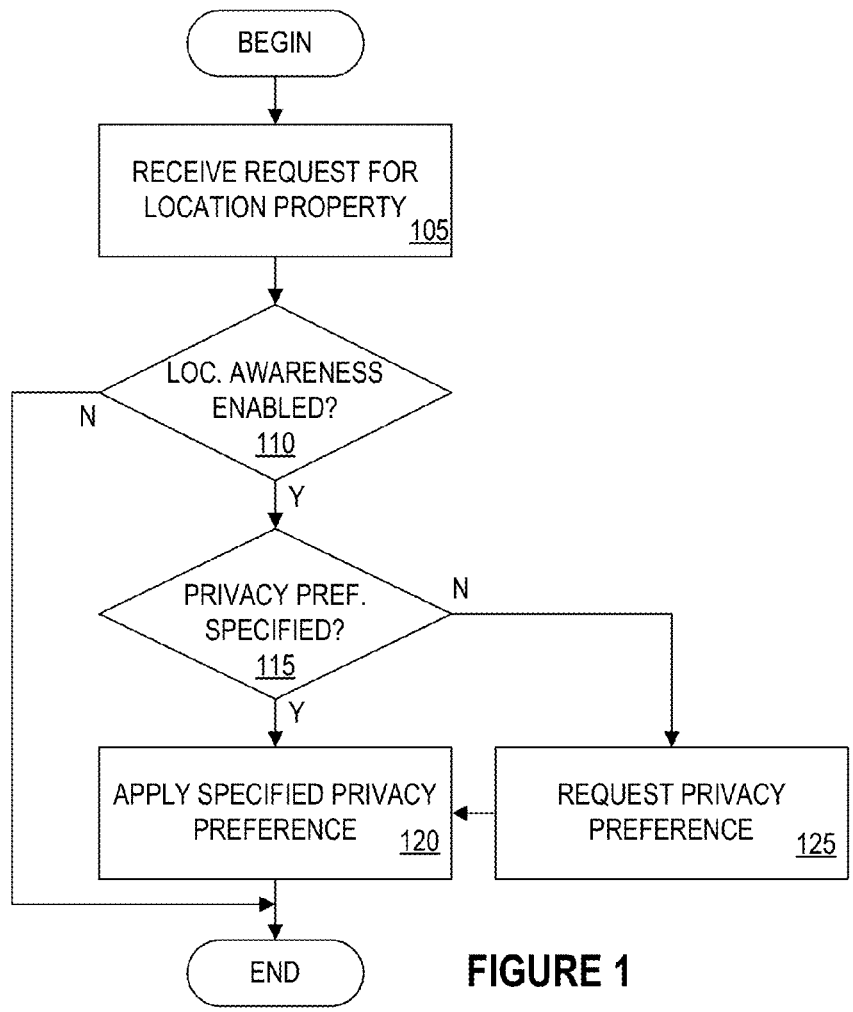
FIG. 1 is a flow diagram showing a method of one embodiment for managing the privacy of location properties.

For one embodiment, referring to FIG. 1, a location privacy manager module associated with a computer system controls, by requestor, access to each of a set of location properties, where a requestor may be, for example, a specific location-based services (LBS) content server (e.g. a web site or web service) or client application. For this embodiment, in response to receiving a request for a location property at block 105, the location privacy manager module may optionally determine at block 110 whether the computer is enabled for location-based computing. If location-based computing is enabled, it is determined at block 115 whether a privacy preference associated with the requestor has been specified. If so, the privacy preference is applied at block 120 to determine whether to provide the requested location property information. If a privacy preference has not been specified for the particular requestor, a preference may be requested at block 125 through, for example, a pop-up user interface (Pop-Up UI) box. The provided preference is then applied at block 120

It will be appreciated that, where block 110 is not included, the method may proceed directly from block 105 to block 115. Further details of these and other embodiments are provided below.

Figure 2:
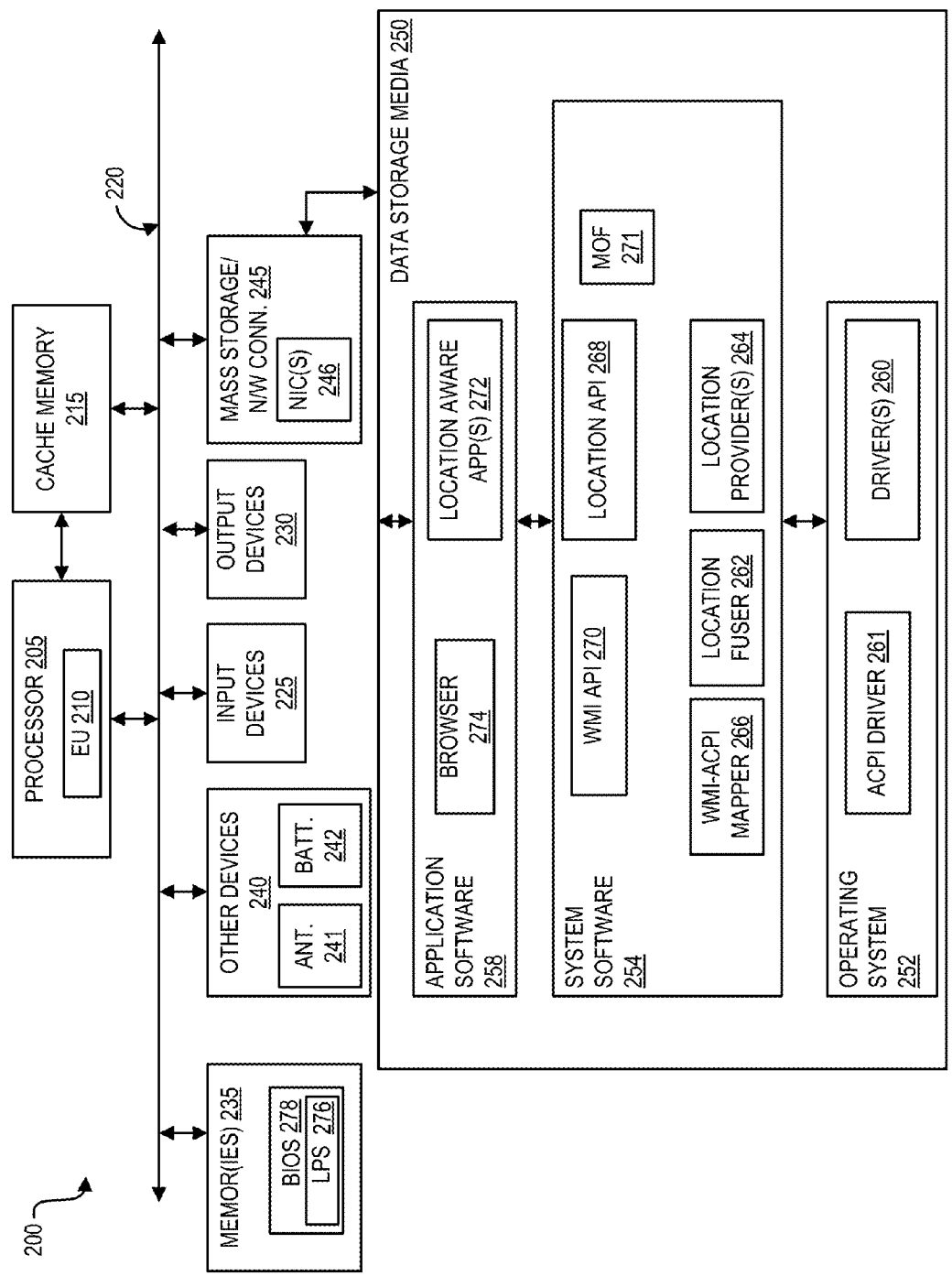
FIG. 2 is a block diagram of an exemplary computing system through which the location privacy manager of one embodiment may be advantageously implemented.

FIG. 2 is a block diagram of an exemplary computing system 200 via which the location privacy management approach of one or more embodiments may be advantageously implemented. For one embodiment, the computer system 200 may be a notebook or laptop computer system, for example. Other types of machines, computing and/or computer systems such as cellular phones, personal digital assistants, etc. are within the scope of various embodiments.

The computer system 200 includes a processor 205 including an execution unit 210 to execute instructions. The processor 205 may be, for example, a Pentium® M microprocessor or other microprocessor available from Intel Corporation of Santa Clara, Calif. Other types of processors, including graphics processors, embedded controllers, digital signal processors, microprocessors from other sources, etc. are also within the scope of various embodiments.

A cache memory 215 may be coupled to or integrated with the processor 205 to store recently and/or frequently used instructions. The processor 205 may be coupled to a bus 220 to communicate information between the processor 205 and other components in the computer system 200.

Also coupled to the bus 220 are one or more input devices 225, such as a keyboard and/or a cursor control device, one or more output devices 230, such as a monitor and/or printer, one or more memories 235 (e.g. random access memory (RAM), read only memory (ROM), etc.) and other components 240 such as one or more antennae 241, a battery adapter 242 to receive a system battery, a memory controller, graphics controller, and/or a bus bridge, etc. (not shown). One or more mass storage devices and/or other network connectivity devices 245, such as one or more network interface cards (NICs) 246 may also be included. The NICs may act as and/or alternately be referred to herein as sensors.

The mass storage device(s) and/or network connectivity devices 245 may further include a hard disk drive, a compact disc read only memory (CD ROM) drive and/or an optical disk drive. One or more of the NIC(s) 246 may operate to couple the computer system 200 to one or more other computer systems or mass storage devices over a wired or wireless network, for example. Further, the mass storage device(s) 245 may include additional or alternate mass storage device(s) that may be accessible by the computer system 200 over a network (not shown).

A corresponding data storage medium (or media) 250 (also referred to as a computer-accessible storage medium) may be used to store instructions, data and/or one or more programs to be executed by the processor 205. For one embodiment, the data storage medium (or media) 250 stores information, instructions and/or programs 252-274 that may be used for location-aware computing and/or to manage privacy/disclosure of location information associated with the computing system 200.

For this exemplary embodiment, an operating system 252, system software 254 and application software 258 may be provided.

The operating system of one embodiment may be, for example a Windows™ operating system from Microsoft Corporation of Redmond, Wash. Other types of operating systems such as, for example, a Linux operating system, are within the scope of various embodiments. The operating system 252 may include drivers 260 associated with one or more components of the system 200, such as the NICs 246, as described in more detail below and an Advanced Configuration and Power Interface (ACPI) driver 261 to provide for ACPI capabilities as described in more detail below.

The system software 254 of one embodiment may include a location fuser 262, one or more location providers 264, a Windows Management Instrumentation (WMI)-ACPI mapper 266, a location application programming interface (API) 268 and/or a WMI API 270. One or more Managed Object Format (MOF) files 271 may also be included. Various features and functions of these modules are described in more detail below.

The application software 258 may include, for example, one or more location aware applications 272 and a web browser 274.

Each of the software modules 252, 254, 256 and 258 may include other modules and/or features not shown or described in conjunction with FIG. 2. Further, while a single block is shown to illustrate data storage media 250, multiple mass storage or other storage devices may be used to store the various programs 252-274.

Other computing systems configured in another manner are also within the scope of various embodiments. For example, while only a single bus 220 is shown, it will be appreciated that multiple buses may actually be used to interconnect the various components of the computer system in a different way. For example, a front-side bus may be coupled directly between the processor and one or more chipset components while a peripheral bus may be coupled between one or more chipset components and one or more peripherals and/or other types of buses.

Figure 3:
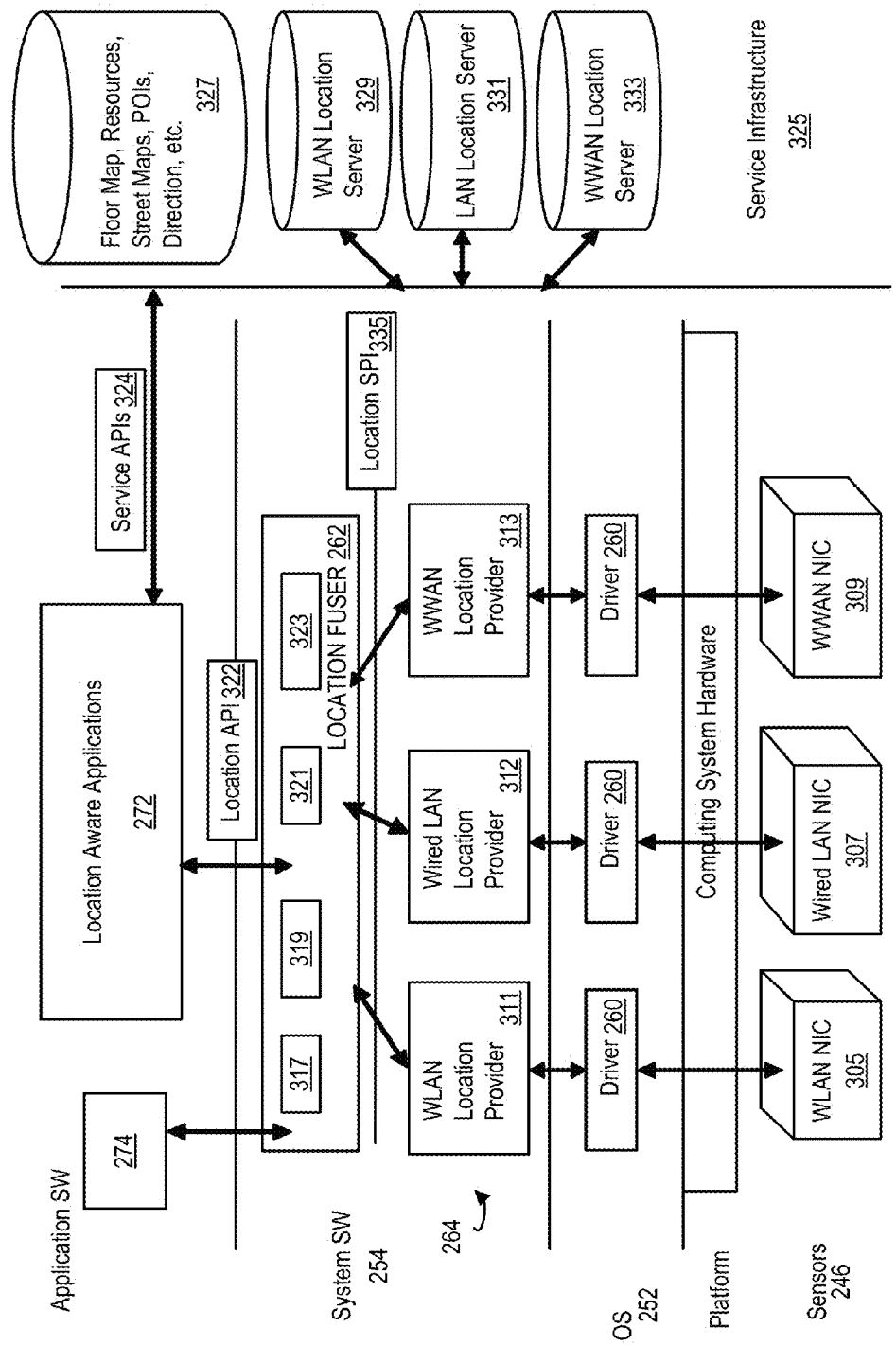
FIG. 3 is a block diagram showing in more detail the various software and hardware modules that may be provided on the computing system of FIG. 2.

FIG. 3 is a block diagram showing some of the various software and hardware modules of FIG. 2 in more detail. As shown in FIG. 3, the sensors 246 of one embodiment may include one or more of a wireless local area network (WLAN) NIC 305, a wired LAN NIC 307, and/or a wireless wide area network (WWAN) NIC 309 and the drivers 260 and location providers 264 may include drivers and location providers 311-313, respectively, associated with each of the sensors 246 as shown. The location providers 264 (FIG. 2) of one embodiment are plug-ins to provide standard and/or custom calls to the drivers 260 to get location information via the drivers.

The system software 254 may also include a module referred to herein as a location fuser 262. Where the operating system 252 is a Windows™ operating system, the location fuser 262 may be, for example, a windows service.

The fuser operates to combine, select and/or derive, through algorithmic and/or mathematical approaches, a reasonable approximation of the computer/user's location based on readings obtained from at least one of the plurality of sensors 246. The location fuser 262 of one embodiment may include a property provider 317 to transmit location property information, a preferences layer 319 to manage user preferences as described in more detail below, a pop-up or other user interface (UI) 321 and scripting capabilities 323 to provide for communication from browser content (e.g. web pages) and other script-based applications, for example. More specifically, the property provider 317 may verify privacy requirements and, if appropriate, provide the value of the requested location propert(ies) by obtaining them from the fuser 262 and the preferences layer 319 provides an interface for various kinds of user interfaces to be plugged in. User-entered privacy preferences are thus handled and stored for later use. Additional and/or different modules may be provided as part of the location fuser for various embodiments. A location service provider interface (SPI) 335 may be provided through which the fuser 262 may communicate with the various location service providers 311-313.

One or more location aware applications 272 may communicate with the location fuser and other modules through a location API 322. Service APIs 324 may be included to provide communication between application software 258 and a service infrastructure 325.

Some elements of an exemplary service structure 325 with which the system 200 may interact are shown in FIG. 3. The system 200 may have access via, for example, the Internet or other network, to one or more databases 327 that store information such as floor maps, street maps, directions, etc. The system 200 may also have access to various location servers such as a WLAN location server 329, a LAN location server 331 and/or a WWAN location server 333.

While the computer system 200 including the elements shown in FIGS. 2 and 3 may provide for location-aware computing, for some embodiments, for privacy reasons, for example, it may be desirable to provide a user with the capability to enable and/or disable location-aware computing.

Figure 4:
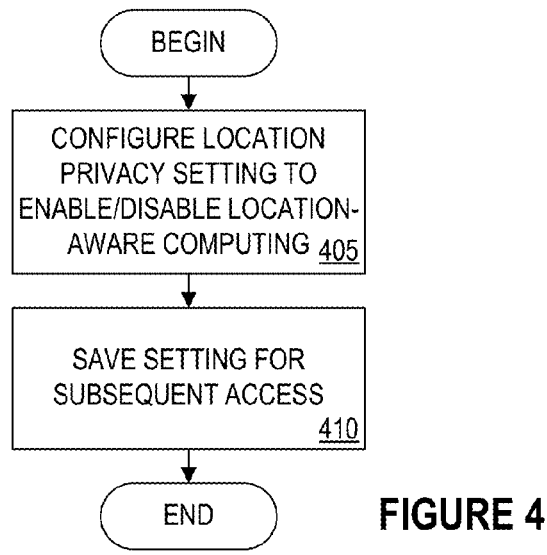
FIG. 4 is a flow diagram showing a method of one embodiment for enabling and/or disabling location-based computing.

Referring to FIGS. 2 and 4, for one embodiment, a basic input/output system (BIOS) memory location 276 may be used to store a location privacy setting (LPS). The BIOS may be stored in a BIOS read-only memory (BIOS ROM) 278 as part of the memories 235, for example.

Using WMI and ACPI instrumentation techniques described in detail in documentation available from Microsoft Corporation that can currently be found at, for example, http://www.microsoft.com/whdc/hwdev/driver/WMI/wmi-acpi.mspx, a Managed Object Format (MOF) file may be defined to describe a Data Block to define the LPS bit 276 and compiled to provide a compiled MOF file 271. The compiled MOF file 271 may then be attached as a resource to a WMIACPI.SYS file (per the ACPI specification, revision 2.0b, dated Oct. 11, 2002) or other file, or provided as a resource-only data dynamic link library (DLL).

The ACPI driver 261 provides the interface for reading the LPS bit 276 setting from BIOS 278. The WMI-ACPI mapper 266 interfaces between the ACPI driver 261 and the WMI API 270 of the operating system 252 to export the LPS bit 276 setting to the location aware application(s) 272.

A Data Block Query Control Method may then be implemented in ACPI/ASL (ACPI Source Language) code to provide for setting the LPS bit 276 (i.e. either enabling or disabling location-aware computing) as part of the BIOS configuration as described below. Once the LPS bit 276 is set, a location-aware application such as the location-aware application 272 (FIGS. 2 and 3) can discover the Data Block information, including the LPS bit 276 setting, by looking in the WMI variable name space exported by the operating system 252, WMI-ACPI mapper 266 and ACPI driver 261. Thus, for one embodiment, the LPS bit 276 may only be set via the BIOS setup screen during BIOS configuration, and not during normal operating system run-time. Further, for this embodiment, the LPS bit 276 may only be queried during the normal operating system run-time using the WMI namespace lookup technique.

While WMI/ACPI instrumentation techniques in conjunction with a BIOS memory location setting are described herein to implement the location privacy setting of one embodiment, it will be appreciated that other approaches for enabling/disabling location-aware computing are within the scope of various embodiments.

An exemplary method of one embodiment for configuring/reading the location privacy setting associated with a computing system is described in reference to FIGS. 2 and 4. At block 405, upon start-up of the computer system 200, or at another time, the location privacy setting bit 276 or other location privacy setting mechanism may be configured by a user to enable and/or disable location computation and/or any location aware activities through, for example, a BIOS set-up routine.

At block 410, the setting is saved such that it can be subsequently accessed as described below to determine whether location awareness is enabled (i.e. whether the computer system 200 can compute and/or convey its location.)

For some embodiments, the location privacy setting bit or comparable feature may not be implemented.

As discussed above, where location-aware computing is enabled, when using location-aware applications or interacting with location-based services over, for example, the Internet, it is desirable for a user to be able to selectively control the privacy and disclosure of location information.

Figure 5:
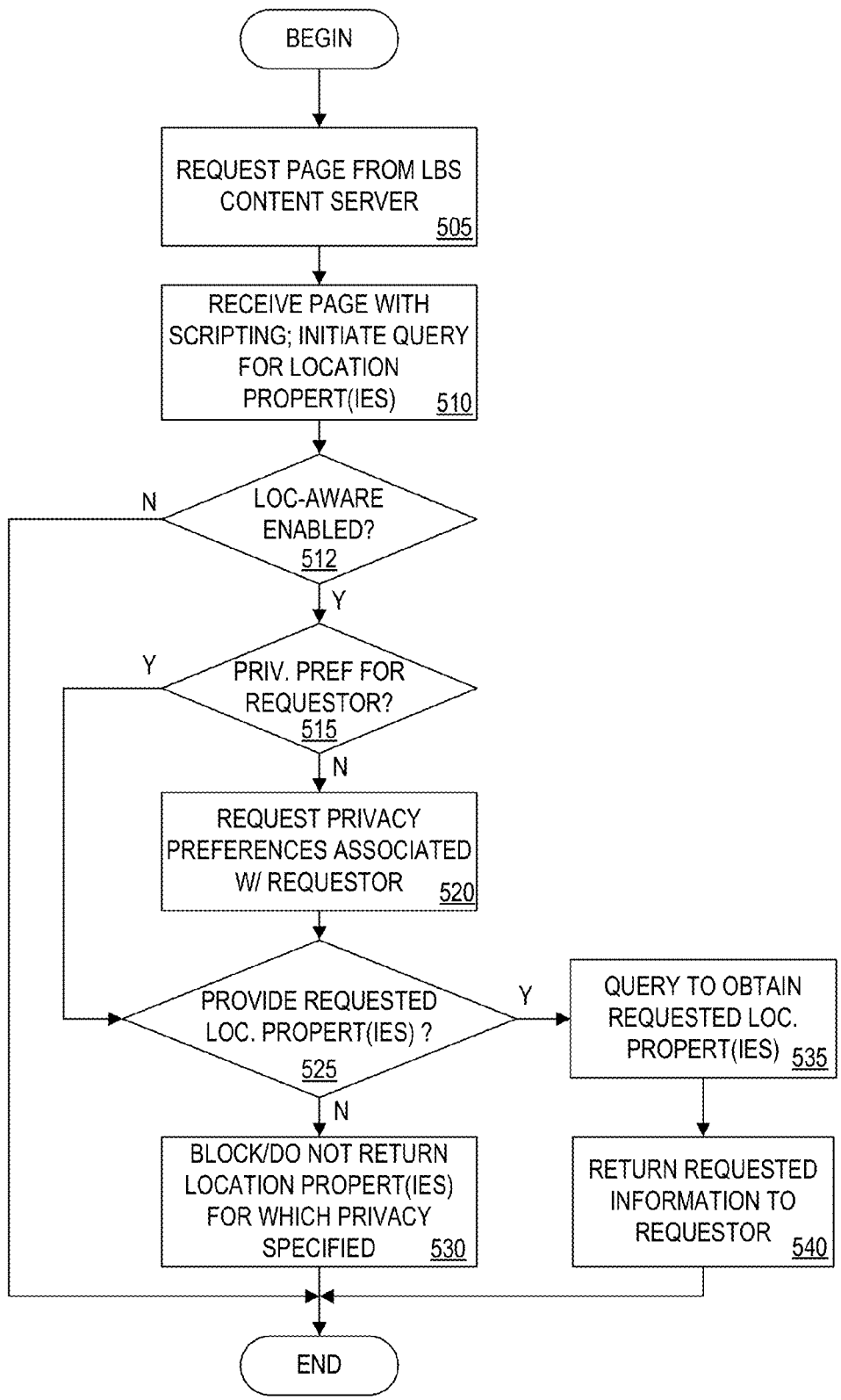
FIG. 5 is a flow diagram showing a method of one embodiment for managing the privacy of location information where the requestor may be a location-based services content server.

FIG. 5 is a flow diagram showing a method of one embodiment for setting/accessing user privacy/disclosure preferences to control location information privacy when accessing a location-based services (LBS) content server or web site. Referring to FIGS. 2, 3, and 5, at block 505, a page is requested from an LBS content server, also referred to more generally as a requestor. A block 510, the page is received with scripting, which may be in the form of ECMAScript in accordance with the ECMAScript specification referred to as ECMA-262 (3rd edition) promulgated by the European Association for Standardizing Information and Communication Systems, formerly known as the European Computer Manufacturer's Association (ECMA). Other scripting languages such as JavaScript from Netscape Corporation of Mountain View, Calif., or JScript from Microsoft Corporation of Redmond, Wash., for example, may alternatively be used.

The scripting may initiate a query at block 510 for one or more location properties (e.g. city, state, latitude, longitude, etc.) from the property provider 317 using the universal resource locator (URL) of the requestor. At block 512, it is determined whether location-aware computing is enabled as described above. If so, then at block 515, it is determined whether a user of the computer system has specified a privacy preference associated with the requestor URL. For one embodiment, privacy preference information may be stored and accessed via the preferences layer 319.

Figure 6:
FIG. 6 is an illustration of an exemplary pop-up user interface that may be used for one embodiment to manage privacy preferences.

If no privacy preference information associated with the requestor URL has been specified, then at block 520, a request is made to the user to provide such privacy preferences. For one embodiment, a pop-up dialog box may be launched, for example. FIG. 6 shows an exemplary pop-up dialog box through which the user may specify privacy preferences. The pop-up dialog box may be part of the pop-up user interface 321.

As shown, the user may individually select particular location properties to provide or prevent transmission of particular location properties in response to a request from the specified URL or other requestor. The pop-up dialog box may also provide an option to prevent or enable transmission of all properties as shown. Once the privacy preferences have been specified, they may be submitted and saved to a memory via the preferences layer 319.

At block 525, it is determined whether the user-specified privacy preferences allow for transmission of the requested location properties to the requestor. If not, or for those properties for which the user has requested privacy, at block 530, no information is returned. If the privacy preferences allow the requested location properties to be provided, then, at block 535, a query may be initiated, for example, by the location fuser 262 to return the location properties. For one embodiment, the query by the location fuser 262 is handled by one of the location providers 311-313 to obtain the requested location information from the service infrastructure 325 via the associated driver 260 and NIC 305, 307 and/or 309. More specifically, the location fuser 262 queries one or more of the location providers 311-313 via the SPI 335. In response to this query, each of the location providers may make standard and/or custom calls to respective device drivers 260 to extract sensor readings from NICs 305, 307 and/or 309. Each of the location providers 311-313 may further query associated location servers 329, 331, and/or 333 to find additional location descriptions associated with the sensor readings (i.e. sensor readings may be used as a "lookup key" into the databases on the location servers 329, 331 and/or 333.)

As described above, the fuser 262 combines, selects or derives a substantially best approximation of the actual computer/user's location using an algorithmic and/or mathematical approach based on sensor readings obtained from device drivers 260 and/or supplemental location descriptions obtained from location servers 329, 331 and/or 333.

It will be appreciated by those of ordinary skill in the art that the fuser 262 may also or alternatively use cached sensor readings or supplemental location descriptions from prior events, rather than execute all of the sequences described above.

At block 540, the requested information is returned to the requestor. For the embodiment shown in FIGS. 2 and 3, the information may be returned through the appropriate sensor, driver and location provider combination to the location fuser 262, through the property provider 317, scripting capabilities and browser 274. Depending on the requestor and location-based computing capabilities, the returned information may result in page element customization. For example, if the requestor is a retailer website, based on the returned location information, the page may be customized to show details of the retail location nearest the user. Additional location information may be subsequently be requested and provided (or not) as previously described.

Referring back to block 515, if privacy preference(s) have been specified for the particular URL or other requestor, those preferences may be applied at block 525, and the remainder of the method proceeds as described above.

Figure 7:
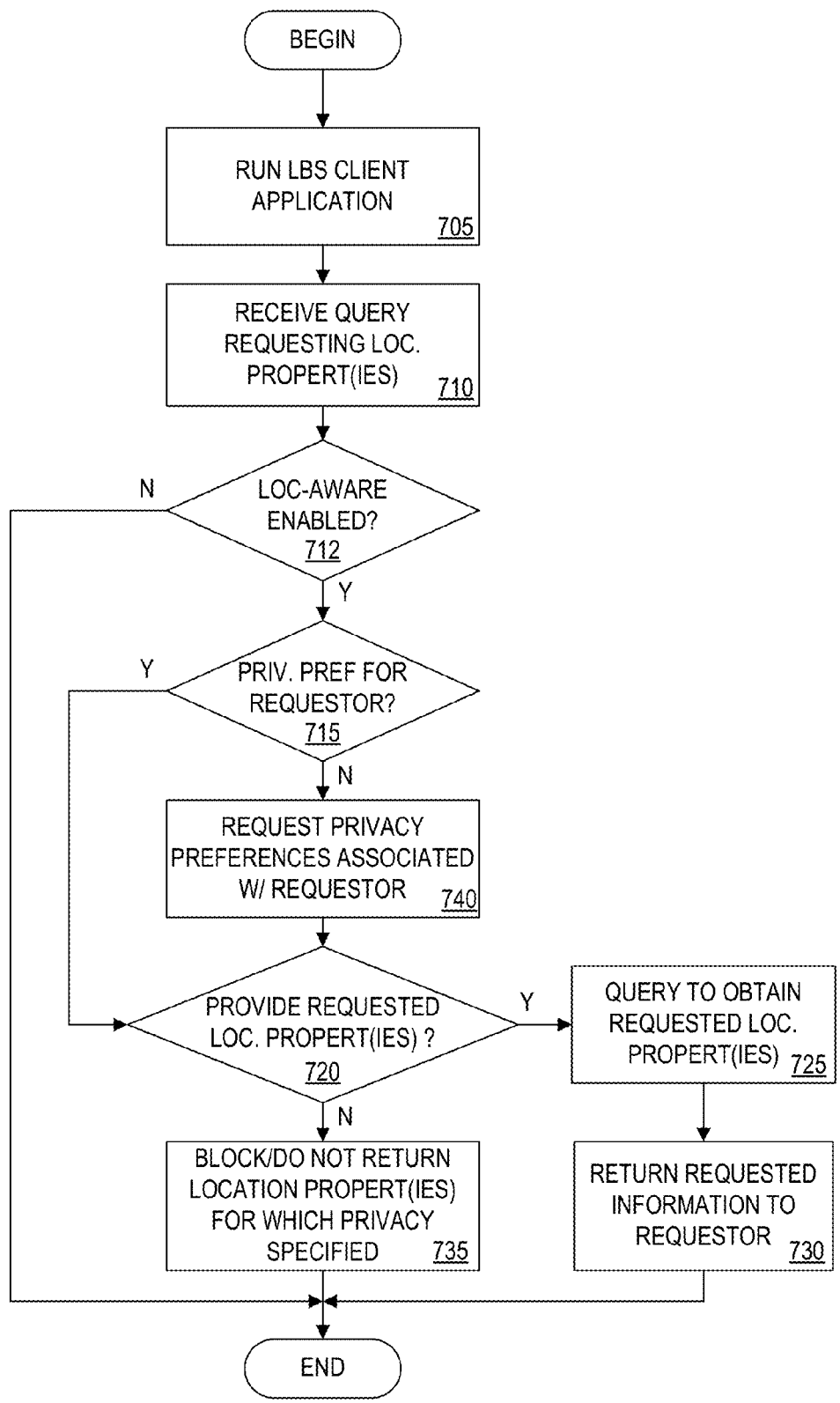
FIG. 7 is a flow diagram showing a method of one embodiment for managing the privacy of location information where the requestor may be a location-based services client application.

FIG. 7 is a flow diagram showing a method of another embodiment for managing privacy of location information for location-based computing. For the embodiment shown in FIG. 7, the requestor is a client location-aware application instead of an LBS content server as described in reference to FIG. 5.

At block 705, the LBS client application is run. An LBS client application may include, for example, an instant messaging application. Other types of LBS applications are within the scope of various embodiments. At block 710, a query requesting one or more location properties is initiated by the client application along with some means for identifying the requesting client application. For example, where the operating system of the host computer is a Windows™ operating system, existing operating system Application Programming Interfaces (APIs) may be used to determine the identity of the requesting application, either by "process name" or by a "process ID" number. Similar facilities are provided for other operating systems.

It is determined at block 712 whether or not the computer system is enabled for location-aware computing. If location-aware computing is enabled, then for the exemplary system of FIGS. 2 and 3, a query is made via the property provider 317 and the preferences layer 319 to determine at block 715 whether user's privacy preferences have been specified for the requestor client application.

If so, then at block 720, the preferences are applied and it is determined whether the requested information can be returned. Information that has been permitted to be returned is returned at blocks 725 and 730 as described above, and information specified to be held private is blocked at block 735.

At decision block 715, if the user's privacy preferences associated with the particular client application have not been specified, then at block 740, privacy preferences are requested. This request may be made as described above through a pop-up dialog box or other mechanism. The specified preferences are then applied at block 720 and the method continues as described above.

If location properties are provided to the client application, they may then subsequently be provided to an outside entity.

It will be appreciated that, for the methods shown and described in reference to FIGS. 5 and 7, for other embodiments, additional actions may be included and/or not all of the actions shown and described may be included.

Using the approaches described above, a user may selectively control aspects of location-based computing to prevent or allow location properties to be transmitted based on the particular requestor.

Thus, various embodiments of a method and apparatus for managing privacy and disclosure of computing system location information are described. In the foregoing specification, the invention has been described with reference to specific exemplary embodiments thereof. It will, however, be appreciated that various modifications and changes may be made thereto without departing from the broader spirit and scope of the invention as set forth in the appended claims. For example, while the exemplary embodiments described above request location information from external entities in response to a query, for other embodiments, location information may be previously ascertained and stored in an accessible and known location. The specification and drawings are, accordingly, to be regarded in an illustrative rather than a restrictive sense.

The invention claimed is:

1. A method comprising:
using a location privacy setting stored in a location in a basic input/output system (BIOS) memory of a computer system to determine whether the computer system is enabled for location-aware computing;
receiving, at the computer system, a request from a requestor for a location property associated with a location of the computer system;
automatically determining, in response to receiving the request, whether a user of the computer system has already specified a location privacy preference for the requestor;
in response to determining that the user of the computer system has not already specified the location privacy preference for the requestor and only if the computer system is enabled for location-aware computing, automatically prompting the user to provide input indicating whether the location property should be shared with the requestor; and
sharing the location property with the requestor only if the user of the computer system has specified the location privacy preference for the requestor to prescribe that the location property should be shared with the requestor and only if the computer system is enabled for location-aware computing; and
wherein the operation of automatically prompting the user to provide input indicating whether the location property should be shared with the requestor comprises:
automatically presenting a user interface that identifies the requestor from whom the request for the location property was received; and
enabling the user to provide input indicating whether the location property should be shared with the requestor identified by the user interface.

2. The method of claim 1 further comprising:
preventing the location property from being provided to the requestor if the location privacy preference specifies that the location property is to be kept private; and
providing the location property to the requestor if the location privacy preference specifies that the location property is to be disclosed to the requestor.

3. The method of claim 1 wherein the operation of automatically prompting the user to provide input indicating whether the location property should be shared with the requestor comprises:
using a pop-up dialog box to prompt the user for input indicating whether the location property should be shared with the requestor.

4. The method of claim 1 wherein the operation of automatically prompting the user to provide input indicating whether the location property should be shared with the requestor comprises:
providing the user with user interface options that allow the user to selectively and individually enable and disable privacy for multiple different location properties.

5. A non-transitory machine-accessible medium storing instructions that, when executed by a machine, cause the machine to perform operations comprising:
using a location privacy setting stored in a location in a basic input/output system (BIOS) memory of a computer system to determine whether the computer system is enabled for location-aware computing;
in response to receiving, at the computer system, a request from a requestor for a location property associated with a location of the computer system, determining whether a user of the computer system has already specified a location privacy preference for the requestor;
in response to determining that the user of the computer system has not already specified the location privacy preference for the requestor and only if the computer system is enabled for location-aware computing, automatically prompting the user to provide input indicating whether the location property should be shared with the requestor; and sharing the location property with the requestor only if the user of the computer system has specified the location privacy preference for the requestor to prescribe that the location property should be shared with the requestor and only if the computer system is enabled for location-aware computing; and wherein the operation of automatically prompting the user to provide input indicating whether the location property should be shared with the requestor comprises:

automatically presenting a user interface that identifies the requestor from whom the request for the location property was received; and enabling the user to provide input indicating whether the location property should be shared with the requestor identified by the user interface.

6. The machine-accessible medium of claim 5, wherein the operations further comprise:

preventing the location property from being provided to the requestor if the location privacy preference specifies that the location property is to be kept private; and providing the location property to the requestor if the location privacy preference specifies that the location property is to be disclosed to the requestor.

7. The machine-accessible medium of claim 5, wherein the operation of automatically prompting the user to provide input indicating whether the location property should be shared with the requestor comprises:

using a pop-up dialog box to prompt the user for input indicating whether the location property should be shared with the requestor.

8. The machine-accessible medium of claim 5 further storing instructions that, when executed by a machine, cause the machine to:

if the computer system is not enabled for location-aware computing, preventing the computer system from providing the requested location property regardless of whether the location privacy preference has been specified and, if specified, regardless of the contents of the location privacy preference.

9. The machine-accessible medium of claim 5, wherein the operation of automatically prompting the user to provide input indicating whether the location property should be shared with the requestor comprises:

providing the user with user interface options that allow the user to selectively and individually enable and disable privacy for multiple different location properties.

10. A system comprising:
a bus to communicate information;
a processor coupled to the bus;
a memory coupled to the bus to store information, wherein the memory includes a basic input/output system (BIOS) memory;
an antenna coupled to the bus to receive a signal to indicate a location of the system; and
a machine-accessible storage medium storing instructions that, when executed by the processor, cause the system to perform operations comprising:

using a location privacy setting stored in a location in the BIOS memory to determine whether the system is enabled for location-aware computing;

in response to receiving, from a requestor, a request for a location property associated with the location of the system, determining whether a user of the system has already specified a location privacy preference for the requestor; and in response to determining that the user of the system has not already specified the location privacy preference for the requestor and only if the system is enabled for location-aware computing, automatically prompting the user to provide input indicating whether the location property should be shared with the requestor; and sharing the location property with the requestor only if the user of the system has specified the location privacy preference for the requestor to prescribe that the location property should be shared with the requestor and only if the system is enabled for location-aware computing; and wherein the operation of automatically prompting the user to provide input indicating whether the location property should be shared with the requestor comprises:

automatically presenting a user interface that identifies the requestor from whom the request for the location property was received; and enabling the user to provide input indicating whether the location property should be shared with the requestor identified by the user interface.

11. The system of claim 10, wherein the operation of automatically prompting the user to provide input indicating whether the location property should be shared with the requestor comprises:

providing the user with user interface options that allow the user to selectively and individually enable and disable privacy for multiple different location properties.

12. The system of claim 10 wherein the operation of automatically prompting the user to provide input indicating whether the location property should be shared with the requestor comprises:

using a pop-up dialog box to prompt the user for input indicating whether the location property should be shared with the requestor.

13. The system of claim 10 wherein the requestor is one of a client application and a location-based service.

* * * * *